United States Patent [19]
Rothmayr et al.

[11] 3,881,896
[45] May 6, 1975

[54] APPARATUS FOR FILTERING GASEOUS FLUIDS

[75] Inventors: Willy Rothmayr, La Tour De Peilz; Jaroslav Dasek, Yverdon, both of Switzerland

[73] Assignee: Societe d'Assistance Technique pour Produits Nestle S.A., Lausanne, Switzerland

[22] Filed: Oct. 18, 1972

[21] Appl. No.: 298,554

[30] Foreign Application Priority Data
Oct. 19, 1971 Switzerland.................... 15207/71

[52] U.S. Cl. ................... 55/97; 55/279; 55/527; 55/DIG. 16; 210/501
[51] Int. Cl............................................ B01d 46/00
[58] Field of Search ........ 55/527, 279, DIG. 16, 97, 55/523, 522; 210/501; 21/53, 74 R

[56] References Cited
UNITED STATES PATENTS

| | | | |
|---|---|---|---|
| 1,914,999 | 6/1933 | Maverick et al................ | 210/501 X |
| 2,477,964 | 8/1949 | Corblin.......................... | 21/74 R X |
| 3,056,247 | 10/1962 | Pindzola et al................. | 55/97 |
| 3,100,146 | 8/1963 | Huntington..................... | 55/97 X |
| 3,252,270 | 5/1966 | Pall et al........................ | 55/523 X |
| 3,261,147 | 7/1966 | Allander......................... | 55/279 X |
| 3,745,748 | 7/1973 | Goldfield et al................ | 55/527 X |

OTHER PUBLICATIONS

"Rohre aus Hanauer Quarzglas," Heraeus–Schott Quarzschmelze GmbH, Hanau, Germany, 7-69.
The Condensed Chemical Dictionary, 8th ed. N.Y., Van Nostrand Reinhold Co., 1971, pp. 588, 746, 783.

*Primary Examiner*—Frank W. Lutter
*Assistant Examiner*—Kathleen J. Prunner
*Attorney, Agent, or Firm*—Watson, Leavenworth, Kelton & Taggart

[57] ABSTRACT

A filter for gaseous fluids includes a packing comprising quartz fibres. The filter may advantageously be used for sterilizing gases, for example gases used in fermentation processes.

2 Claims, 3 Drawing Figures

APPARATUS FOR FILTERING GASEOUS FLUIDS

The present invention is concerned with an apparatus for filtering gaseous fluids, and is more particularly directed to a filter for sterilizing gaseous fluids used in fermentation processes.

Utilization of gaseous fluids in industrial fermentation or microorganism culture processes, for example air in aerobic fermentations or various gases, such as ammonia as nitrogen source, or gaseous paraffins as carbon sources, necessarily implies that these gaseous fluids be sterile to avoid contamination of the culture medium by extraneous microorganisms.

Efforts have been made to develop various sterilization processes for gaseous fluids, such as heating, irradiation with ultra-violet rays, or filtration.

Sterilization by heating, involving heating of the gas to an elevated temperature, which may exceed 300°C for example, may ensure total destruction of undesirable microorganisms provided the temperature and treatment time have been suitably chosen. However, the industrial operation of such a process is generally very costly in view of the size of the necessary installations and the running and maintenance expenses of such equipment.

Sterilization by irradiation with ultra-violet light necessitates installations of substantial dimensions; in addition certain bacteria and molds are very resistant to ultra-violet radiation.

Sterilization by filtration, which consists of removing from the gas undesirable microorganisms as well as other impurities, by passage through one or more filters packed with cotton fibres, glass wool or asbestos, or a granular material such as carbon particles, is considerably less expensive than the previously mentioned processes, but has the serious disadvantage of not assuring total elimination of undesirable microorganisms.

An object of the present invention is to provide a particularly simple filtering device which is very efficient and easy to operate.

The invention provides an apparatus for filtering gaseous fluids which includes at least one filtration element having a packing comprising quartz fibres.

The invention also provides a process for sterilizing a gaseous fluid, which comprises passing the fluid through at least one filtration element having a packing comprising quartz fibres.

By the expression "packing comprising quartz fibres" is meant, in this specification, a gas permeable material of non-compacted structure comprising stacked, entwined or woven fibres, at least a part of these being fibres of crystalline or amorphous quartz. If other fibres are present in this packing, they may be, for example, textile scraps, glass fibres or cellulosic or resinous fibres. The packing may also be made up of different superimposed fibrous layers of various types, at least one of these layers comprising quartz fibres.

The accompanying drawings show, by way of example, one embodiment of the apparatus according to the invention.

Figure 1:
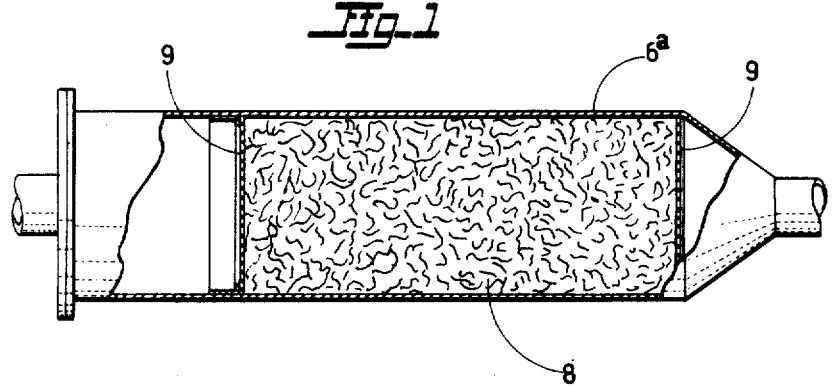
FIG. 1 is an axial section of a filter.

As shown in FIG. 1, the filter comprises a cylindrical chamber 6a containing a packing 8 consisting of quartz fibres retained between two screens 9. These fibres, the diameter of which is generally between 5 and 15 microns, can be present as a non-woven mass of such fibers or "quartz wool"; however, woven quartz fibres may also be used as packing.

Figure 2:
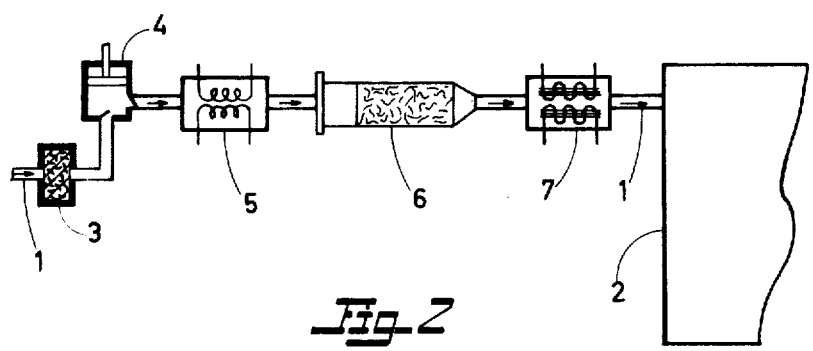
FIG. 2 is a diagram showing a filtration system comprising a filter according to the invention.

FIG. 2 shows a filtration system comprising an inlet pipe 1 feeding a gaseous fluid to a vessel or fermenter 2. On the path of the pipe 1 are arranged, from upstream to downstream, a first filter 3 having for example a packing of glass wool for eliminating impurities such as dust and other solid particles, a compressor 4, a heater 5, a filter 6 packed with quartz fibres, and a cooler 7 for the gaseous fluid.

Retention of microorganisms present in the gaseous fluid by the permeable material comprising quartz fibres has been found to be especially efficient and the sterilizing effect of this material on a gaseous fluid is observed to be substantially superior to that of filtering materials normally used, such as glass wool or cotton fibres, with respect to the same microorganisms and under the same conditions of temperature and fluid flow rate.

In particular, total sterilization of a gas at ambient temperatures, that is close to 25°C, which is very difficult, or impossible, to achieve with conventional filter materials, has been easily obtained by filtration of the gas through quartz wool.

The sterilizing power of quartz fibres, which is substantially higher at ambient temperatures to that of traditional materials, is also better at high temperatures.

A particularly advantageous application of the device according to the invention comprises sterilizing the gas or gases fed to a fermenter by filtration through the quartz fibre filter. The compressed gas, for example air for fermentations under aerobic conditions, ammonia as nitrogen source, or a gaseous paraffin such as methane as carbon source, is passed through at least one filter element packed with quartz fibres before entering the fermenter. According to the type of undesirable microorganisms present in the gas, it may optionally be heated to an appropriate temperature. This temperature is generally considerably below the temperature necessary to obtain the same sterilizing effect when using conventional filter materials, and may for example be obtained by simple adiabatic compression of the gas to be sterilized.

The invention is illustrated by the following Examples.

EXAMPLE 1

Figure 3:
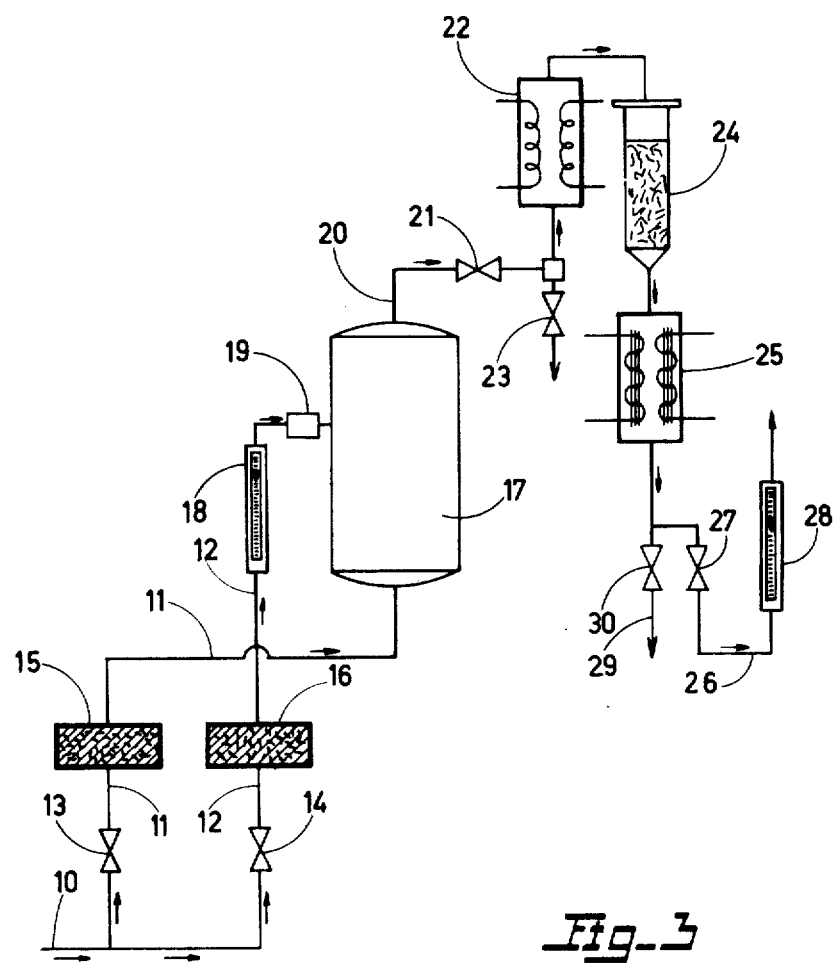
FIG. 3 is a diagram of an experimental apparatus.

In order to observe the sterilizing effect of a filter, the experimental apparatus shown in FIG. 3 is used. This apparatus comprises a feed pipe 10 for gaseous fluid branching into two pipes 11 and 12 connected in parallel and respectively having, from upstream to downstream, flow rate and pressure control valves 13 and 14 for gaseous fluid and filters 15 and 16 packed with glass wool. The pipe 11 is connected to the lower part of a reservoir 17 and the pipe 12, provided with a flowmeter 18 of the rotameter type, is connected to the upper part of the reservoir 17 by way of a spray chamber 19 containing a suspension of a microorganism. The gas streams carried by the pipes 11 and 12, that is the main stream passing through pipe 11 and having the highest flow rate, and the stream passing through pipe 12, contaminated with the microorganism present in the chamber 19, are mixed in the reservoir 17 and arrive, by way of the pipe 20 and valve 21, at a heater 22 in the bottom of which is provided a device 23 for taking samples of contaminated gas. The heater 22 is itself connected to the filter 24 the sterilizing capacity of which is being observed. The exit opening of this filter 24 is connected to a cooler 25. The exit pipe 26 of the cooler, which is provided with a control valve 27 and a flowmeter 28, has a branch 29 provided with a valve 30 for taking samples of filtered gas.

The filter 24 is cylindrical, the diameter and length being respectively 108 mm and 161 mm.

After packing of the filter 24 with 55 g of quartz wool having an average fibre diameter of 7 to 10 microns (Manufacturer: Deutsche Gold- une Silberscheideanstalt, Hanau), the part of the apparatus including the filter 24, the heater 22, the cooler 25 and the sampling ports is sterilized with a current of steam at 130° – 140°C during 30 minutes. Air is then circulated through the pipes 10, 11, 20 and 26 in order to dry the different parts of the apparatus and to equilibrate the temperature.

After an aqueous suspension containing Bacillus stearothermophilus spores has been introduced into the spray chamber 19, the valve 14 is opened to introduce air into the pipe 12 and chamber 19. The pressure within the reservoir 17 and the total air flow rate are adjusted with valves 27 and 13. Samples are taken at different times and for varying periods at 23 (contaminated air) and at 29 (filtered air).

The spore suspension used to contaminate the gas stream to given concentrations, which are expressed as the number of spores per litre of air, is examined by counting the spores in a series of 0.1 ml samples placed on sterile nutrient agar plates which are incubated during 48 hours at 56°C and then counted. These counts give the concentration of the suspension in terms of the number of spores per litre.

The samples of air taken at 23 and at 29 pass through sterile Millipore membrane filters for specific periods of time. Counting of the spores collected on these filters is made under the same conditions as those described for the suspension samples.

The trials have been effected at different temperatures and with various times, that is the samples of filtered air were taken for different periods and after various periods of use of the filter. The results of these trials are summarized in Table I below.

In this Table the parameters shown have the following meanings:

| | |
|---|---|
| Period 1 | Period of use of the filter with a constant flow of contaminated air (95 l/h), before the sample is taken. |
| Period 2 | Length of time during which the sample is taken at 29 at a flow rate of 10 l/h, the flow rate is the filter remaining at 95 l/h. |
| Number of spores before filtration: | Determined by counting spores in contaminated air samples taken at 23 during Period 1. |
| Number of spores after filtration: | Determined by counting spores in the sample taken at 29. |
| Temperature 1. | Temperature of the air at the exit of the heater 22. |
| Temperature 2. | Temperature of the air at the exit of the cooler 25. |

Efficiency: $\dfrac{No - N}{No} \times 100$

No being the number of spores counted before filtration and
N being the number of spores counted after filtration in the same volume of air.

Table I

| Period (minutes) | | Number of spores | | Temperature °C | | Efficiency % |
|---|---|---|---|---|---|---|
| | 2 | Before filtration | After filtration | 1 | 2 | |
| 0 | 15 | 51,400 | 1 | 25 | 25 | 99.998 |
| 60 | 15 | 18,241 | 0 | 25 | 25 | 100 |
| 60 | 15 | 9,741 | 0 | 25 | 25 | 100 |
| 0 | 15 | 37,200 | 0 | 150 | 38 | 100 |
| 60 | 15 | 109,600 | 2 | 150 | 41 | 99.998 |
| 60 | 30 | 120,200 | 0 | 150 | 37 | 100 |
| 60 | 15 | 127,500 | 0 | 150 | 38 | 100 |
| 0 | 30 | 127,500 | 0 | 150 | 39 | 100 |
| 0 | 30 | 91,800 | 0 | 150 | 38 | 100 |

Trials effected under identical conditions with a filter having the same geometry and packed with 100 g of glass wool have shown that its efficiency varies between 97.6 and 99.7 percent for filtration temperatures close to 25°C, and only reaches 100 percent at temperatures close to 250°C.

These results demonstrate the extreme efficiency of the filter packed with quartz wool, which is 100 percent in numerous cases, and independent of temperature within the temperature ranges used.

EXAMPLE 2

The efficiency of a cylindrical filter, the diameter and length of which are respectively of 108 and 161 mm is measured as described in Example 1. The filter is packed with 55 g of quartz wool manufactured by Electrotermic, Lucens, Switzerland.

The results obtained are summarized in Table II below, the parameters being those defined in Example 1.

Table II

| Period (minutes) | | Number of spores | | Temperature °C | | Efficiency % |
|---|---|---|---|---|---|---|
| 1 | 2 | Before filtration | After filtration | 1 | 2 | |
| 0 | 15 | 212,500 | 36 | 25 | 25 | 99.983 |
| 0 | 10 | 13,500 | 1 | 25 | 25 | 99.992 |
| 0 | 5 | 29,200 | 5 | 25 | 25 | 99.982 |
| 0 | 10 | 47,700 | 9 | 25 | 25 | 99.981 |
| 0 | 15 | 48,500 | 1 | 150 | 36 | 99.998 |
| 0 | 30 | 85,850 | 2 | 150 | 36 | 99.997 |
| 0 | 30 | 170,000 | 8 | 150 | 36 | 99.995 |
| 15 | 30 | 10,625 | 0 | 170 | 144 | 100 |

These results also show a higher efficiency as compared to the filter packed with glass wool described in Example 1.

We claim:

1. Process for sterilizing a microorganism-containing gaseous fluid which comprises passing the fluid through a gas-permeable non-compacted mass of quartz fibers, said fibers having a diameter of between 5 and 15 microns.

2. Process according to claim 1 in which the quartz fibers are present in the form of quartz wool.

* * * * *